(No Model.)
H. F. JULIAN.
PROCESS OF EXTRACTING GOLD AND SILVER FROM THEIR ORES.
No. 418,134. Patented Dec. 24, 1889.
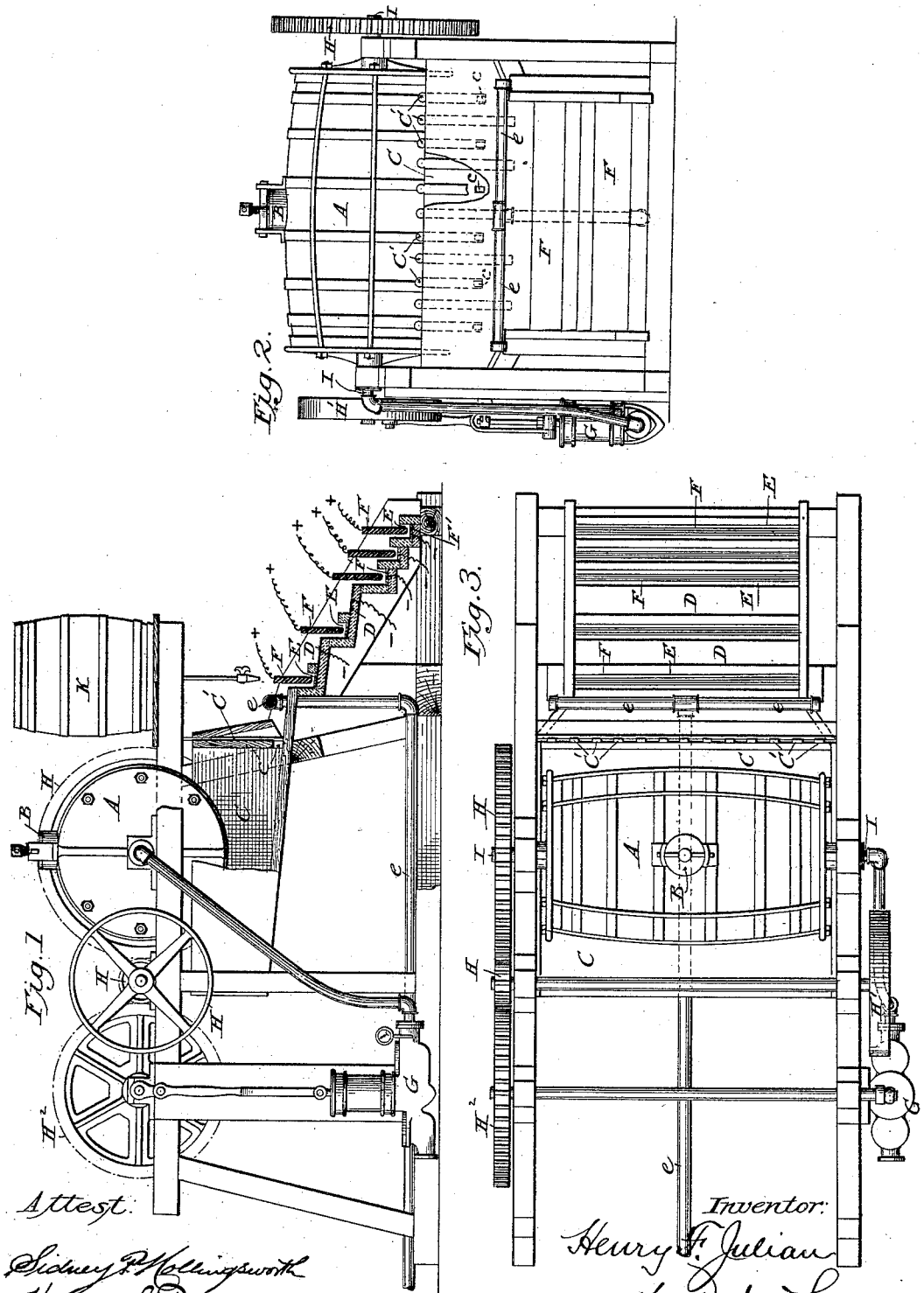

UNITED STATES PATENT OFFICE.

HENRY FORBES JULIAN, OF JOHANNESBURGH, TRANSVAAL, SOUTH AFRICA, ASSIGNOR TO FLAVIEN ERNEST LEZARD AND JAMES JOSEPH COGHLAN, TRUSTEES.

PROCESS OF EXTRACTING GOLD AND SILVER FROM THEIR ORES.

SPECIFICATION forming part of Letters Patent No. 418,134, dated December 24, 1889.

Application filed September 24, 1888. Serial No. 286,243. (No model.)

*To all whom it may concern:*

Be it known that I, HENRY FORBES JULIAN, mining engineer, a citizen of the Transvaal, residing at Frazer Street, Johannesburgh, Transvaal, South Africa, have invented certain new and useful Improvements in the Process of Extracting Gold and Silver from their Ores, of which the following is a specification.

This invention relates to an improved process of and apparatus for the extraction and recovery of gold and silver from ores by means of the action of chlorine, bromine, or iodine and mercury, and to the application of electricity for decomposing and amalgamating.

The invention may be understood by the following description, reference being had to the accompanying drawings, in which—

Figure 1 is a side elevation, partly in section, of a plant adapted to effect the purposes of the invention. Fig. 2 is a front elevation of the same, and Fig. 3 is a plan.

The ore after being pulverized by suitable means is placed in a rotatable vat, or a vat constructed with apparatus adapted to agitate its contents, the said vat being preferably constructed of such materials as are not acted upon to any great extent by the chemicals employed within it. Such a rotating vat is shown at A. It is mounted upon a horizontal axis I, and is driven from the belt-pulley H' through the medium of gearing H H. With the ore in the vat there is added a small quantity of chlorine, bromine, or iodine, or of a mixture of two or all of these substances, or of chemicals which produce chlorine, bromine, or iodine. There is also added as much water as will reduce the mass after agitation to the consistency of semi-liquid mud. The man-hole of the vat is then closed by a tight cover—such as B—and the contents subjected to the pressure of air, steam, or other fluid by means of any suitable device—such as an air-compressor G—which is driven by the gear H' H H$^2$, and has its outlet connected with the hollow shaft I. The pressure may be almost anything above that of the atmosphere. About sixty to eighty pounds to the square inch will suffice in most cases. The vat is now rotated while under pressure, and its contents agitated for a period sufficient to cause them to assume the consistency of a uniform semi-liquid mud. This period may vary from a few minutes to several hours, according to the nature of the ore under treatment, and the pressure applied to the contents in the vat, one or two hours being the usual time.

In the above operation the gold is wholly or partly dissolved by the action of the chlorine, bromine, or iodine, aided by the pressure within the vat, while the silver is converted into an insoluble compound, which may be, for example, a chloride, bromide, or iodide, according to which chemical or chemicals have been employed. The gold which is not dissolved is, however, so prepared that it will readily amalgamate with mercury in the following operation:

The man-hole of the vat is now opened, and a quantity of mercury or sodium amalgam is added to the semi-liquid mass, either in the same vat or in another one. The man-hole is then closed, the pressure of the air, steam, or other fluid again applied to the contents, and the latter are then preferably agitated, as before, but only for a few minutes, as a general rule. In this operation the gold is readily precipitated by the mercury and formed into an amalgam, and a portion of the mercury replaces the gold so precipitated. The pressure within the vat also accelerates the operation of precipitation and amalgamation.

If thought advisable, the portion of the gold contained in solution may, before the mercury is added, be leached out and precipitated by any known means, and the gold and silver remaining in the ore may then be extracted therefrom, as above described.

After the above second operation, the cover B is removed and the contents of the vat emptied into a receiver C, where they are allowed to settle for a short time. The receiver has preferably a sloping bottom, and is provided with outlet-openings *c*, which are controlled by slides C'. After settling, the slides C' are drawn up, and the ore, amalgam, &c., on issuing from the openings c are by means of jets of water washed down and distributed over one or more inclined plates D of amalgamated copper. The water-jets may be supplied by a perforated pipe l, placed in front of the openings c. The plates D are so inclined that the ore, &c., may be washed off them readily, the inclination being about one inch to the foot. Each plate is connected, preferably, at its foot, as shown, to the negative pole of an electric generator, for a purpose hereinafter set forth. After the passage of the material over the plates D, and also, if desired, before its passage over the same, it is caused to pass through a series of electrolytic cells E, arranged successively one below the other, so that a liquid may flow through one and fall into the next. The cells consist of a number of narrow troughs or boxes, preferably made of some non-conductor of electricity, and each provided with a cathode F' of mercury, (or sodium or potassium amalgam,) connected with the negative pole of an electric generator and with an anode F, of carbon, platinum, lead peroxide, or other suitable material, which is connected with the positive pole of the said generator. The mercury cathode F' is placed at the bottom of the cell, and the anode F is supported above and at a convenient distance from it. The anodes F thus serve as vertical partitions for the cells E, and the material washed down from the receiver C and plates D, falling successively into the cells, is obliged to pass through each between its anode and cathode. If desirable, the anode F may be simply attached to the lower edge of a suitable vertical partition of some other material. The number of such cells will vary according to circumstances; but usually four to nine are found to be ample. The cells at the heads of the copper plates D are similar to those below them; but the mercury cathodes F' are connected to the negative pole of the generator by means of the plates, which are extended backward, as shown, so as to form the bottoms of the cells in direct contact with the mercury cathodes.

The action of the electrolytic cells and copper plates is as follows: The ore on leaving the vat may contain some gold or silver or mercury compounds, and also some floured mercury or floured amalgam and metallic gold. To prevent any of these being lost in the tailings, the whole of the ore and solution is passed through the electrolytic cells and over the copper plates, while a strong current of electricity is kept constantly flowing from the anodes to the cathodes. During the passage of the ore and solution through the cells any gold and silver compounds that may be present are decomposed and the gold and silver go to the mercury cathode, where they readily amalgamate and are retained. Any floured mercury or floured amalgam and metallic gold that may be present are also retained in a somewhat similar manner.

Part of the amalgam in the solution is retained by the amalgamated copper plates D. These are used as a guide to the operator in order that he may see what is going on. They should be kept covered with sodium or potassium amalgam. This may be done by allowing a solution of potassium or sodium compounds—such as salt, soda, or potash—to pass through the cells and over the plates while the current of electricity is passing. This solution may be conveniently kept in a vessel K, placed above the upper cell and provided with a suitably-controlled outlet-pipe, as shown.

The sodium or potassium of the solution is deposited and amalgamated at the mercury cathodes, while the element with which it was combined is liberated at the anodes.

The gold or silver may be obtained from the amalgam in the usual way.

It will be obvious that the form of the plant for carrying out the above process may be modified considerably without altering the process itself.

Having thus described my invention, what I claim is—

The improvement in the process of extracting gold and silver from ores, which consists in agitating the pulverized ore in closed vats with chlorine, bromine, or iodine and water under pressure of a fluid forced into the vat, and after the gold and silver have combined with the halogen, adding mercury and again agitating under pressure of a fluid forced into the vat, next passing the ore, mercury, and solution over amalgamated copper surfaces forming the cathode of an electric circuit, and subsequently submitting the mixture to electrolytic action between cathodes of mercury below and suitable anodes above, substantially as described.

In testimony whereof I have signed my name to this specification in the presence of two subscribing witnesses.

HENRY FORBES JULIAN.

Witnesses:
E. URAN OTTO,
I. D. AURST.